United States Patent [19]

Doering

[11] 4,339,037

[45] Jul. 13, 1982

[54] MOLDABLE HANDLE FOR DISK PACK ASSEMBLY

[75] Inventor: Arlin B. Doering, South St. Paul, Minn.

[73] Assignee: Minnesota Mining and Manufacturing Company, Saint Paul, Minn.

[21] Appl. No.: 204,631

[22] Filed: Nov. 6, 1980

[51] Int. Cl.³ .................. G11B 1/02; B65D 85/57; B65D 25/28
[52] U.S. Cl. .................................. 206/444; 220/318; 346/137
[58] Field of Search ............. 206/444, 303; 220/318; 340/174.1 C; 346/137

[56] References Cited

U.S. PATENT DOCUMENTS

| | | | |
|---|---|---|---|
| 3,465,875 | 9/1969 | Kelvey, Jr. | 206/444 |
| 3,509,992 | 5/1970 | David et al. | 206/444 |
| 3,643,240 | 2/1972 | Raiser | 206/444 |
| 3,762,543 | 10/1973 | Wirth | 206/444 |

Primary Examiner—William T. Dixson, Jr.
Attorney, Agent, or Firm—Cruzan Alexander; Donald M. Sell; Randall J. Gort

[57] ABSTRACT

A handle for use with a computer disk pack memory unit which handle comprises a first and a second part assembled together to provide the releasable engagement of an axle within the computer disk pack and which two-part structure permits the fabrication of the entire handle by holding techniques.

6 Claims, 4 Drawing Figures

MOLDABLE HANDLE FOR DISK PACK ASSEMBLY

TECHNICAL FIELD

This invention relates to the structure of handles used in disk pack assemblies.

BACKGROUND ART

Disk pack assemblies typically comprise a memory unit including a plurality of disks with magnetizable coatings, mounted in spaced relationship on a hub, and a central axle rotatably mounted in the center of the hub which serves as a bolt to attach the memory unit to a disk drive. Also included are top and bottom cover assemblies which mate around and protect the memory unit when it is not being utilized on a disk drive. The bottom cover assembly includes a latch which releasably engages the hub to hold the bottom cover assembly in place and can be manually released from outside the bottom cover so that the bottom cover assembly can be removed to expose the hub and axle for engagement with the disk drive. The top cover assembly includes a handle having a stem portion with a socket adapted to closely receive an upper portion of the axle and having axially projecting pins on its end adapted to engage openings on a generally central, radially projecting flange on the axle so that a transverse portion of the handle can be manually engaged and the handle can be used as a wrench to rotate the axle into or out of engagement with a disk drive. The axle also has a mechanism which will normally hold locking elements or ball bearings mounted in the portion of the axle which is received in the socket of the handle, in a position projecting outwardly from the surface of the axle. A portion of the socket has an increased diameter capable of receiving the axle when the ball bearings are projecting therefrom. An adjacent inwardly projecting lip around the opening of the socket prevents movement of the axle out of the socket as long as the ball bearings are projecting therefrom. This mechanism thereby maintains the top cover assembly in engagement with the memory unit and allows the memory unit to be carried via the handle. The mechanism is operated by a projection on the disk drive that allows the ball bearings to retract into the axle when the axle is engaged on a disk drive. The handle (and thereby the top cover) is thereby automatically released from the memory unit as the memory unit is secured to a disk drive.

Heretofore, in order to provide the inner wall surface defining the socket, including the inwardly projecting lip at the opening of the socket, the area of increased diameter within the socket adjacent the lip that receives the ball bearings from the axle, and a smaller diameter innermost portion of the socket that closely receives the uppermost portion of the axle, the surface had to be machined in a first part of the handle, a second part which provides the innermost portion of the socket and a portion adapted for manual engagement was then molded around the machined part.

DISCLOSURE OF INVENTION

The present invention provides a handle structure which can perform all the functions required by a handle within a disk pack assembly, but which can be entirely fabricated by molding techniques, thereby simplifying the manufacturing process of the handle for the disk pack assembly and reducing its cost.

The handle according to the present invention includes a first part comprising a stem portion having a through passageway opening through a contact surface, and a lip adjacent the contact surface, which lip extends radially inward to decrease the diameter of the passageway and is adapted to fit closely around the periphery of the axle adjacent its flange. The portion of the passageway adjacent the lip has a diameter or cross-sectional area adapted to receive the locking elements or ball bearings of the axle when they are in their outer position to lock the lip between the balls and the flange on the axle. When the axle is in this position within the handle, at least one pin, fixed in the first part, has a portion projecting outwardly from the contact surface in a position affording engagement with one of the holes in the flange of the axle so that rotational force applied to the handle will be transmitted through the pin to the axle to engage it with or disengage it from the disk drive. A second part of the handle comprises a portion fixable in the passageway of the first part with a distal end of the portion spaced from the lip to afford engagement of the ball bearings of the axle in a groove therebetween, and having a cavity opening through the distal end which closely receives the portion of the axle above the balls to center it in the handle and afford lateral support for the axle when it is supported via the handle. One of the parts of the handle includes a portion adapted for manual engagement, which extends transverse of the axis and which facilitates lifting of the axle, and thereby the disk pack assembly via the axle, and rotation of the axle via the handle to attach the memory unit to, or release it from, a disk drive.

Since neither part of the handle has a passageway or cavity with an area of increased diameter or cross-sectional area, the access to which is blocked or limited by adjacent areas having smaller passageways, the parts can be separately molded with conventional molding techniques. After molding, the parts can be assembled and fastened together to provide the handle according to the present invention which has a socket for receiving the axle of a memory unit having essentially the same internal shape as the handle of the prior art, but which was fabricated in a more simple and inexpensive manner.

BRIEF DESCRIPTION OF THE DRAWING

The invention will be further described with reference to the accompanying figures wherein like numbers refer to like parts in the several views and wherein.

DETAILED DESCRIPTION OF THE PREFERRED EMBODIMENT

Figure 1:
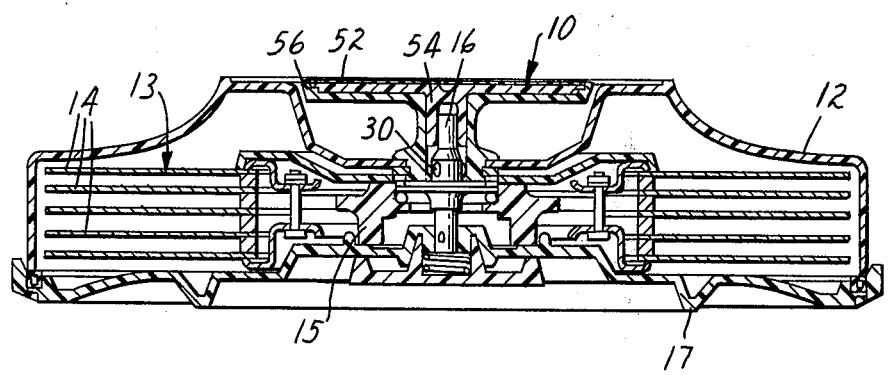
FIG. 1 is a cross-sectional view of a disk pack assembly including a central cylindrical axle and a cooperating handle according to the present invention.

Referring now to FIG. 1 there is shown a disk pack assembly comprising a handle 10 according to the present invention, a top dust cover 12 mounted on the handle 10, a memory unit 13 comprising a plurality of disks 14 having magnetizeable coatings which are fixed coaxially on a hub 15 in a spaced relationship, a central cylindrical axle 16 rotatably mounted in the hub 15 and having an upper portion releasably secured within a socket in handle 10 by means later to be explored, and a bottom dust cover 17 which is releasably attached to the hub 15 by a latch mechanism (not shown) that can be manually released so that the bottom cover 17 can be removed when the memory unit 13 is to be placed on a disk drive.

Figure 2:
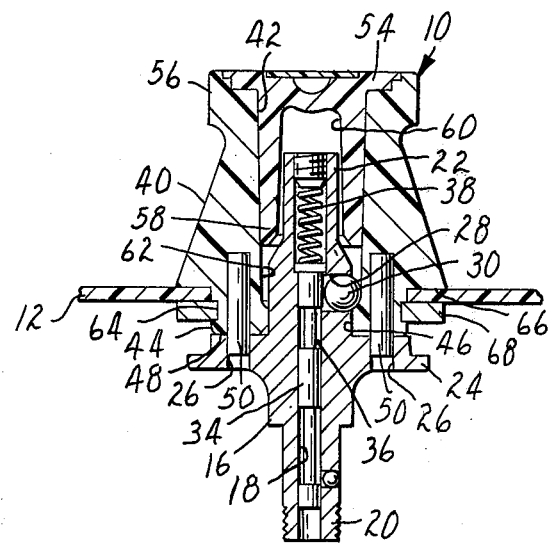
FIG. 2 is an enlarged fragmentary sectional view of the handle and the axle shown in FIG. 1.

The novel structure of the handle 10 and the means for releaseably attaching the axle 16 to the handle 10 is best seen in FIG. 2. The axle 16 is generally cylindrical and contains walls defining a through bore 18. A first end 20 of the axle 16 is threaded and can engage or screw into a complimentary threaded portion of a disk drive (not shown) to attach the memory unit 13 to the disk drive. Approximately midway along the axle 16, between its first end 20 and a second opposite end 22, is a radially projecting flange 24. This flange contains a plurality of holes 26 spaced in a predetermined pattern around the bore 18. These holes 26 cooperate with pins 50 projecting from the handle 10 as will be further described to afford the application of torque to the axle 16 via the handle 10 in order to screw it into or out of the disk drive. The walls of the axle 16 also define a plurality of passageways 28 extending radially outward from the bore 18 through the exterior surface of the axle 16. These passageways 28 are generally disposed in a single plane which is perpendicular to the longitudinal axis of the bore 18 and which is located between the flange 24 and second end 22 of the axle 16. Trapped within each of these passageways 28 is a ball bearing 30. Each ball bearing 30 and the passageway 28 in which it is located, is sized such that the ball bearing 30 can move within the passsageway 28 from one end to the other, but will always project from one end of the passageway 28 be it either exterior to the surface of the axle 16 or interior of the bore 18. The particular position of the ball bearing 30 is determined by the presence of an inner stem 34 which is free to move longitudinally within the confines of the bore 18. The stem 34 contains a recessed surface 36 which is capable of receiving a portion of the ball bearing 30 allowing it to project interior of the bore. The remainder of the stem 34 is of a diameter which forces the ball bearing 30 to its radially outward position causing its projection from the exterior surface of the axle 16. The stem 34 is biased to a position adjacent the first end 20 of the axle 16 by spring 38. At this position the full diameter portion of the stem 34 is adjacent the ball bearing 30 resulting in the outward projection of the ball bearings 30 from the stem 34. The disk drive contains a cooperating structure (not shown) which enters the bore 18 from the first end 20 of the axle 16 when the memory unit 13 is screwed onto a disk drive. This cooperating structure is designed to force the stem 34 toward the second end 22 of the axle 16. As this is done, the recessed surface 36 of the stem 34 moves adjacent the passageways 28 and affords the receipt of the ball bearing 30 within the bore 18. It is the combination of this biased stem 34, the passageways 28 and the ball bearings 30 contained therein, that provide means cooperating with inner surfaces of a socket in the handle 10 as will be described, for releaseably securing the axle 16 within the socket in the handle 10, and for releasing the axle 16 from the handle 10 upon the engagement of the memory unit 13 on the disk drive.

As is also best seen in FIG. 2, the handle 10 includes a first part comprising a stem portion 40 with walls defining a through passageway 42. A first end 44 of the stem portion 40 has a lip 46 disposed generally perpendicular to the longitudinal axis of the passageway 42 and extending radially inward thus decreasing the transverse area of the passageway 42 adjacent the first end 44. The decreased transverse area defined by the lip 46 permits the passage of the upper portion of the axle 16 past the lip 46 and into the passageway 42 only when the ball bearings 30 have been received within the bore 18, whereas the larger portion of the passageway adjacent the lip 46 has a diameter adapted to receive the ball bearings 30 of the axle 16 when they are in their outer portion. Thus, whenever the ball bearings 30 are projecting radially outward (as is normally the case when the memory unit 14 is not engaged on the disk drive) the axle 16 cannot pass through the first end 44 of the stem portion 40. The stem portion 40 also has a contact surface 48 disposed generally perpendicular to the longitudinal axis of the passageway 42. Projecting from this contact surface 48 is at least one and preferably two pins 50 positioned within the contact surface 48 to afford engagement of at least one of the holes 26 within the flange 24. The first part of the handle 10 includes a portion 52 adapted for manual engagement which is disposed generally transverse to the bore 42 to afford the transfer of torque applied to the portion 52, through the pins 50 to the flange 24 and thus to the axle 16.

The handle 10 also includes a second part 54 which is adapted to be inserted within a second end 56 of the stem portion 40. This insert portion 54 has a length which is shorter than the length of the passageway 42 such that a distal end 58 of the insert portion 54 remains spaced from the lip 46 of the stem portion 40 when the insert portion 54 has been completely inserted within the passageway 42. The insert portion 54 includes walls defining a cavity 60 adapted to receive and closely support the second end 22 of the axle 16. When the insert portion 54 has been inserted within the passageway 42, the distal end 58 of the insert portion 54 and the lip 46 of the contact surface 48 define an annular groove 62 therebetween. This groove 62 is adapted to receive and secure the ball bearings of the axle 16. It can be seen from FIG. 2 that the groove 52, which has an adequate transverse area to receive the axle 16 when the ball bearings 30 are projecting therefrom, is bordered on one side by the projecting lip 46 which has a smaller transverse area than that of the passageway 42, and on the other side by the insert portion 54, the wall members of which also define a smaller transverse area than that of the passageway 42. Thus once the axle 16 with the ball bearings projecting is received within the passageway 42, the axle 16 is locked therein until the ball bearings 30 become recessed within the bore 18, permitting its withdrawal from the handle 10.

It is because of this configuration, i.e., an interior having a larger transverse area accessible only through openings having a smaller transverse area, that the molding of this handle through conventional techniques is prohibited. However as is shown in FIG. 2, and described herein, the incorporation of the passageway 42, the lip 46, the contact surface 48, the pins 50, and the portion adapted for manual engagement 52 (see FIG. 1) into the first part, and the incorporation into the second part 54 of the cavity 60 permits the molding of these separate handle parts. The two parts as molded can then be assembled and fastened together to form the finished handle 10.

In order to fasten the handle 10 to the top cover member 12 the walls of the first part of the handle 10 further define an annular depression 64 spaced radially outward from the bore 42. This depression 64 is located proximate to the contact surface 48. Spaced a short distance from the annular depression 64 is a flange 66 which extends radially outward from the bore 42. This flange 66 provides support for the top dust cover 12 which is secured to the handle 10 by a lock ring 68 inserted in depression 64.

Figure 3:
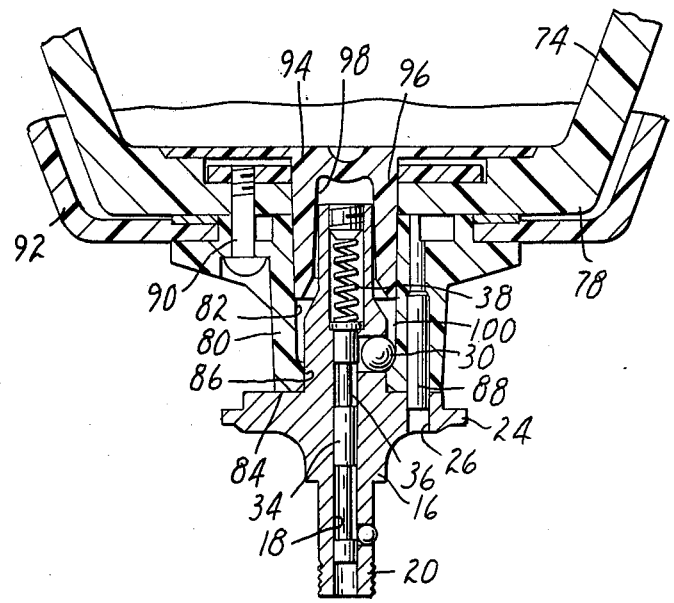
FIG. 3 is a sectional view of a disk pack assembly including an alternate embodiment of a handle according to the present invention.
Figure 4:
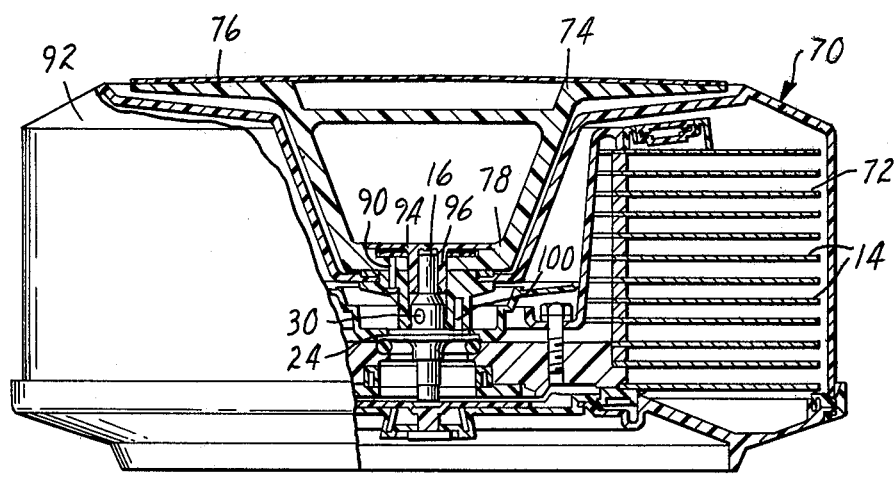
FIG. 4 is an enlarged fragmentary sectional view of the handle and an axle shown in FIG. 3.

FIGS. 3 and 4 illustrate an alternate embodiment of the present invention. The disk pack 70 which is shown provides a larger capacity memory unit 72. As such, a handle 74, having a larger portion 76 adapted for manual engagement must be utilized. The handle 74 again includes a first part 78 including a stem portion 80 having walls defining a through bore 82 adapted to receive the central axle 16. The stem portion 80 has a contact surface 84 on one end disposed generally perpendicular to the longitudinal axis of the bore 82, and extending radially inward to define a lip 86 decreasing the diameter of the passageway 82. At least one pin 88 projects perpendicularly from this contact surface 84 to afford engagement of at least one of the holes 26 in the flange 24 of the central axle 16. This stem portion 80 is coupled to the portion 76 adapted for manual engagement, by bolts 90. In this embodiment the top dust cover 92 is inserted between the stem portion 80 and the manual engagement portion 76. In this manner the dust cover 92 is also held in place by the bolts 90. The handle 74 has a second part 94 including an insert portion 96 which is inserted within the bore 82. The insert portion 96 includes walls defining a cylindrical cavity 98 to support the axle 16. Furthermore an annular groove 100 is defined between the insert portion 96 and the lip 86 to receive and secure the ball bearings 30 of the axle's locking element. This embodiment also permits the molding of all components of the handle 74.

Having thus described preferred embodiments of the present invention it will be understood that changes may be made in size, shape and configuration of some of the parts without departing from the present invention as described in the appended claims.

What is claimed:

1. A handle adapted for releasably engaging an axle in a computer disk pack memory unit, said handle including:
    a first part comprising a stem portion having a contact surface, a through passageway having an axis and opening through said contact surface, and an inwardly projecting lip adjacent said contact surface decreasing the transverse area of said passageway to closely receive the axle;
    a plurality of pins fixed in said first part and having portions projecting from said contact surface in a direction generally parallel with said axis, said pins being adapted to engage the axle;
    a second part comprising a portion fixed in said passageway and entering said passageway on the end of said stem portion opposite said projecting lip, said second part having a distal end spaced from said lip and having a cavity opening through said distal end; and
    one of said parts includes a portion adapted for manual engagement extending generally transverse of said axis.

2. A handle for use with a disk pack assembly including a central cylindrical axle having a first end which is threaded to afford engagement with a disk drive; a radially projecting flange located approximately midway between the first end and a second end of said axle, said flange having a plurality of holes spaced in a predetermined pattern around said axle; a locking element and means for radially projecting said locking element beyond the circumference of said axle between said flange and said second end, and for affording the recession of said locking element within the circumference of said axle when said memory unit is engaged within the disk drive; said handle including:
    a first part comprising a stem portion having a through passageway, a contact surface extending radially around said passageway on a first end of said stem portion and disposed generally perpendicular to the longitudinal axis of said passageway, a lip adjacent said contact surface projecting inwardly within said passageway to decrease the transverse area of said passageway and closely receive the axle adjacent the flange; at least one pin projecting perpendicularly from said contact surface and disposed to engage at least one of the holes in the flange thereby affording the transmission of torque through said handle and to the axle; and
    a second part comprising an insert portion adapted to be inserted within said passageway at a second end of said stem portion, said insert portion having a length shorter than the length of said passageway such that a distal end of said insert portion remains spaced from said lip of said first part when said insert portion has been completely inserted within said passageway; and having a cavity adapted to receive and closely support the second end of said axle, whereby upon the complete insertion of said insert portion in said stem portion the distal end of said insert portion and said lip define an annular groove therebetween, said groove being adapted to receive the locking element of the axle when the locking element is projecting from the axle;
    one of said parts having a portion adapted for manual engagement disposed generally transverse of said passageway.

3. A handle as claimed in claims 1 or 2 wherein said first and second parts are molded from a polymeric material.

4. A handle as claimed in claims 1 or 2 further comprising a dust cover and means for fastening said dust cover to said handle.

5. A handle as claimed in claim 4 wherein said means for fastening said dust cover to said handle comprise an annular depression spaced radially outward from said bore and proximate to said contact surface; a flange extending radially outward from said bore, and spaced a short distance from said annular depression; and a lock ring, whereby said dust cover can be positioned between said flange and said depression and said lock ring can be inserted in said depression, to secure said dust cover against said flange.

6. A handle as claimed in claim 2 wherein said first part is affixed within said second part with said insert portion inserted in said through passageway.

* * * * *

UNITED STATES PATENT AND TRADEMARK OFFICE
CERTIFICATE OF CORRECTION

PATENT NO. : 4,339,037
DATED : July 13, 1982
INVENTOR(S) : Arlin B. Doering

It is certified that error appears in the above—identified patent and that said Letters Patent is hereby corrected as shown below:

Column 4, line 46, change "groove 52" to -- grove 62 --.

Signed and Sealed this

Twenth-eighth Day of September 1982

[SEAL]

Attest:

GERALD J. MOSSINGHOFF

Attesting Officer     Commissioner of Patents and Trademarks